(12) United States Patent
Pourcher et al.

(10) Patent No.: US 11,207,733 B2
(45) Date of Patent: Dec. 28, 2021

(54) DEVICE FOR CONVEYING ADDITIVE MANUFACTURE CONTAINER/PLATE ASSEMBLIES (71) Applicant: COMPAGNIE GENERALE DES ETABLISSEMENTS MICHELIN, Clermont-Ferrand (FR)

(72) Inventors: Benoît Pourcher, Clermont-Ferrand (FR); Christophe De Lajudie, Clermont-Ferrand (FR); Gilles Walrand, Clermont-Ferrand (FR); Frédéric Pialot, Clermont-Ferrand (FR); Christian Geay, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 633 days.

(21) Appl. No.: 16/065,616

(22) PCT Filed: Dec. 20, 2016

(86) PCT No.: PCT/FR2016/053586
§ 371 (c)(1),
(2) Date: Jun. 22, 2018

(87) PCT Pub. No.: WO2017/109394
PCT Pub. Date: Jun. 29, 2017

(65) Prior Publication Data
US 2021/0197477 A1 Jul. 1, 2021

(30) Foreign Application Priority Data
Dec. 23, 2015 (FR) ...................... 1563238

(51) Int. Cl.
B29C 64/25 (2017.01)
B29C 64/30 (2017.01)
(Continued)

(52) U.S. Cl.
CPC .............. B22F 10/20 (2021.01); B29C 64/25 (2017.08); B29C 64/259 (2017.08); B29C 64/30 (2017.08);
(Continued)

(58) Field of Classification Search
CPC ..... B29C 64/182; B29C 64/25; B29C 64/255; B29C 64/259; B29C 64/30; B29C 64/364;
(Continued)

(56) References Cited

U.S. PATENT DOCUMENTS 5,275,545 A  1/1994 Ohyanagi et al.
5,658,412 A  8/1997 Retallick et al.
(Continued)

FOREIGN PATENT DOCUMENTS

DE  102009056689 A1  6/2011
EP  1700686 A2  9/2006
(Continued)

OTHER PUBLICATIONS

International Search Report dated Apr. 21, 2017, issued in PCT/FR2016/053586.
(Continued)

Primary Examiner — Mary Lynn F Theisen
(74) Attorney, Agent, or Firm — Venable LLP (57) ABSTRACT A device is provided for conveying additive manufacturing container/tray assemblies or additive manufacturing trays, the conveying device including at least two chambers for conveying an additive manufacturing container/tray assembly, each conveying chamber including at least one opening allowing the entry/exit of an additive manufacturing con-
(Continued)

tainer/tray assembly, and each opening being provided with a door for closing the conveying chamber in a sealed manner.

9 Claims, 4 Drawing Sheets (51) Int. Cl.
  *B29C 64/364* (2017.01)
  *B29C 64/357* (2017.01)
  *B29C 64/379* (2017.01)
  *B33Y 30/00* (2015.01)
  *B33Y 40/20* (2020.01)
  *B29C 64/259* (2017.01)
  *B22F 10/20* (2021.01)
  *B29C 64/35* (2017.01)

(52) U.S. Cl.
  CPC ............ *B29C 64/35* (2017.08); *B29C 64/357* (2017.08); *B29C 64/364* (2017.08); *B29C 64/379* (2017.08); *B33Y 30/00* (2014.12); *B33Y 40/20* (2020.01)

(58) Field of Classification Search
  CPC ..... B29C 64/371; B29C 64/379; B22F 12/38; B22F 12/80–88; B33Y 40/20
  See application file for complete search history.

(56) References Cited

U.S. PATENT DOCUMENTS

| | | |
|---|---|---|
| 6,824,714 B1 | 11/2004 | Türck et al. |
| 6,824,717 B2 | 11/2004 | Schafer |
| 6,940,037 B1 | 9/2005 | Kovacevic et al. |
| 2006/0214335 A1 | 9/2006 | Cox |
| 2008/0201008 A1 | 8/2008 | Twelves et al. |
| 2009/0169664 A1 | 7/2009 | Cox |
| 2010/0305742 A1 | 12/2010 | Twelves, Jr. et al. |
| 2014/0265048 A1 | 9/2014 | Burris et al. |
| 2015/0314389 A1 | 11/2015 | Yamada |
| 2017/0334134 A1 | 11/2017 | Herzog |
| 2018/0215097 A1 | 8/2018 | Pourcher et al. |
| 2018/0236504 A1 | 8/2018 | Pourcher et al. |
| 2019/0009334 A1 | 1/2019 | Effernelli et al. |

FOREIGN PATENT DOCUMENTS

| | | |
|---|---|---|
| EP | 1961514 A2 | 8/2008 |
| EP | 2926927 A2 | 10/2015 |
| WO | 2014039378 A1 | 3/2014 |

OTHER PUBLICATIONS

Written Opinion dated Jun. 29, 2017, issued in PCT/FR2016/053586 (in French).

DEVICE FOR CONVEYING ADDITIVE MANUFACTURE CONTAINER/PLATE ASSEMBLIES

BACKGROUND

The invention relates to the field of powder-based additive manufacturing by sintering or melting the grains of said powder using an energy beam with electromagnetic radiation, such as a laser beam, and/or a particle beam, such as an electron beam.

More specifically, the invention relates to the containment of an additive manufacturing facility comprising a plurality of additive manufacturing machines and the contained transport of the additive manufacturing trays within such a facility.

During the implementation of an additive manufacturing process inside the manufacturing chamber of an additive manufacturing machine, a first layer of powder is deposited on an additive manufacturing tray mounted slidingly inside a manufacturing sleeve held in position inside the manufacturing chamber. Then, this first layer of powder is consolidated in a predetermined pattern using one of the abovementioned energy beams. Next, the manufacturing tray is lowered inside the manufacturing sleeve so as to allow the deposition and consolidation of a second layer of powder. Finally, the steps of lowering the tray and then depositing and consolidating the layers of powder follow one another until the deposition and consolidation of the last layer of powder required for the manufacture of the parts to be produced.

On completion of the additive manufacturing cycle, the manufactured parts are connected to the additive manufacturing tray by their base, and the manufactured parts are buried in a large amount of unconsolidated powder.

To retrieve the manufactured parts, it is necessary to extract the additive manufacturing tray from the manufacturing chamber of the machine. Preferably, the additive manufacturing tray and the manufactured parts are extracted from the manufacturing chamber with the aid of a container which is positioned under the manufacturing sleeve. Advantageously, said container may also be used to recover and transport the unconsolidated powder which surrounds the manufactured parts.

In order to implement a new additive manufacturing cycle, a new, clean tray must be inserted and put in place in the manufacturing chamber of the additive manufacturing machine.

When using a plurality of additive manufacturing machines for the production of parts on an industrial scale, the operations of extraction and insertion of additive manufacturing trays cannot be carried out manually by operators.

First, the operators would be repeatedly exposed to the toxicity of certain components of the additive manufacturing powders. Second, when performed manually, these operations would take too much time.

Thus, as disclosed for example in U.S. Pat. No. 6,824,714, chain conveyor means may be used to convey, in an automated manner, empty container/tray assemblies to the manufacturing chamber of an additive manufacturing machine and to extract from said chamber the container/tray assemblies used with the manufactured parts and the unconsolidated powder surrounding them.

According to a first disadvantage of the solution described in document U.S. Pat. No. 6,824,714, the container/tray assemblies filled with unconsolidated powder are extracted from the machine and conveyed without protection or means to prevent unconsolidated powder grains from spreading in the facility.

Given the toxicity of certain components of additive manufacturing powders used industrially, especially for the manufacture of metal parts, the solution disclosed in U.S. Pat. No. 6,824,714 presents environmental hazards and health and safety risks for people moving around in the facility, even if they wear the appropriate protective equipment, such as overalls, goggles and masks.

Lastly, according to another disadvantage of the solution described in U.S. Pat. No. 6,824,714, the automated means for inserting and extracting the additive manufacturing container/tray assemblies do not make it possible to preserve the inert or controlled atmosphere required for the additive manufacturing process implemented inside the manufacturing chamber of the additive manufacturing machine.

Therefore, with the automated solution disclosed in U.S. Pat. No. 6,824,714, it is necessary to provide a step of inerting or conditioning the air present inside the manufacturing chamber after each step of extraction of an additive manufacturing container/tray assembly. From an industrial point of view, this air conditioning or inerting step reduces the amount of time the additive manufacturing machines are effectively in use and therefore the production capacities.

Lastly, to comply with certain rules for protection of the environment and the health of persons working in additive manufacturing facilities, there is also a need to improve the sanitary conditions of use of additive manufacturing machines.

SUMMARY

Thus, the present invention aims to overcome at least one of the disadvantages identified in the prior art and to meet the abovementioned industrial needs.

To this end, the subject matter of the invention is a device for conveying additive manufacturing container/tray assemblies.

According to the invention, the conveying device comprises at least two chambers for conveying an additive manufacturing container/tray assembly, each conveying chamber comprising at least one opening allowing the entry/exit of an additive manufacturing container/tray assembly, and each opening being provided with a door for closing the conveying chamber in a sealed manner.

Advantageously, the two conveying chambers make it possible to transport additive manufacturing container/tray assemblies in a contained manner. Moreover, by making it possible to separately transport the clean trays and the trays supporting the manufactured parts and covered with unconsolidated powder, the two conveying chambers make it possible to preserve the cleanness of the clean trays until they are put in place and used within the manufacturing chamber of an additive manufacturing machine.

Then, the invention also relates to an additive manufacturing facility comprising a plurality of additive manufacturing machines and such a device for conveying additive manufacturing container/tray assemblies.

From a more global point of view, the invention also relates to a method for conveying additive manufacturing container/tray assemblies within an additive manufacturing facility comprising a plurality of additive manufacturing machines.

According to the invention, the method provides that the additive manufacturing container/tray assemblies are transported in an automated and contained manner within said facility.

BRIEF DESCRIPTION OF THE DRAWINGS

Further features and advantages of the invention will become apparent from the description which follows. This description, provided by way of non-limiting example, refers to the attached drawings, in which.

DETAILED DESCRIPTION

Figure 1:
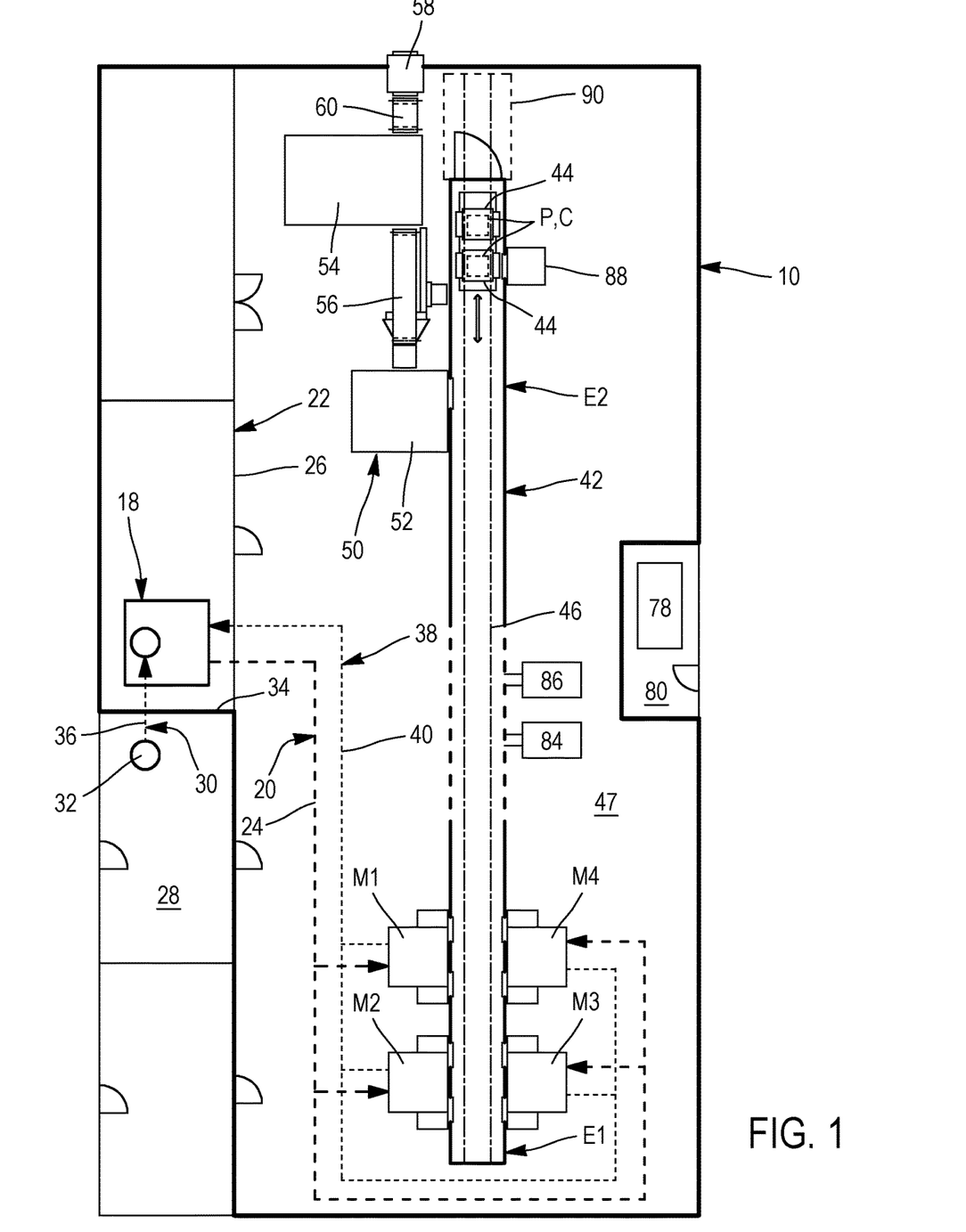
FIG. 1 is a schematic aerial view of an additive manufacturing facility according to the invention.
Figure 2:
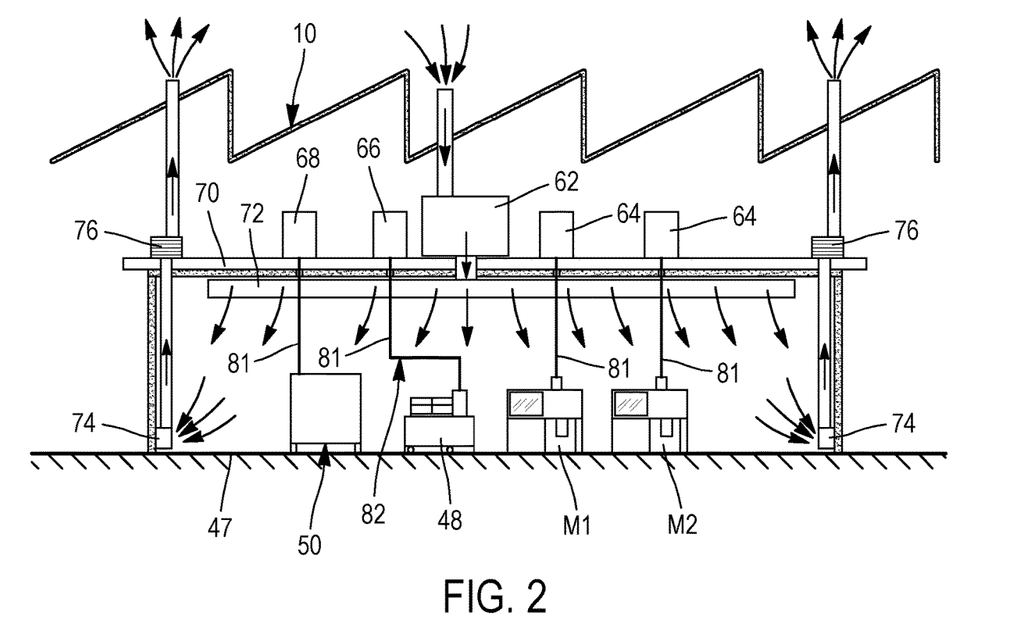
FIG. 2 is a schematic side view of an additive manufacturing facility according to the invention.
Figure 3:
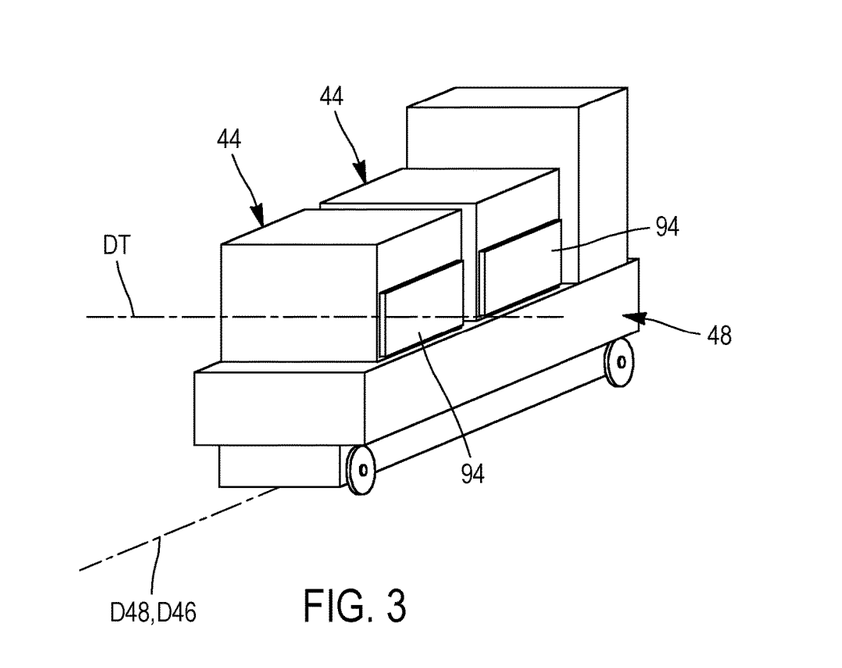
FIG. 3 is a schematic perspective view of a conveying device for conveying additive manufacturing container/tray assemblies according to the invention.

As shown in FIG. 1, the invention relates to an additive manufacturing facility comprising a plurality of additive manufacturing machines M1, M2, M3, M4 installed inside a containment chamber 10 of the facility.

Containment chamber 10 means a sealed chamber that prevents the circulation of air present inside the chamber to the outside of the chamber.

Figure 6:
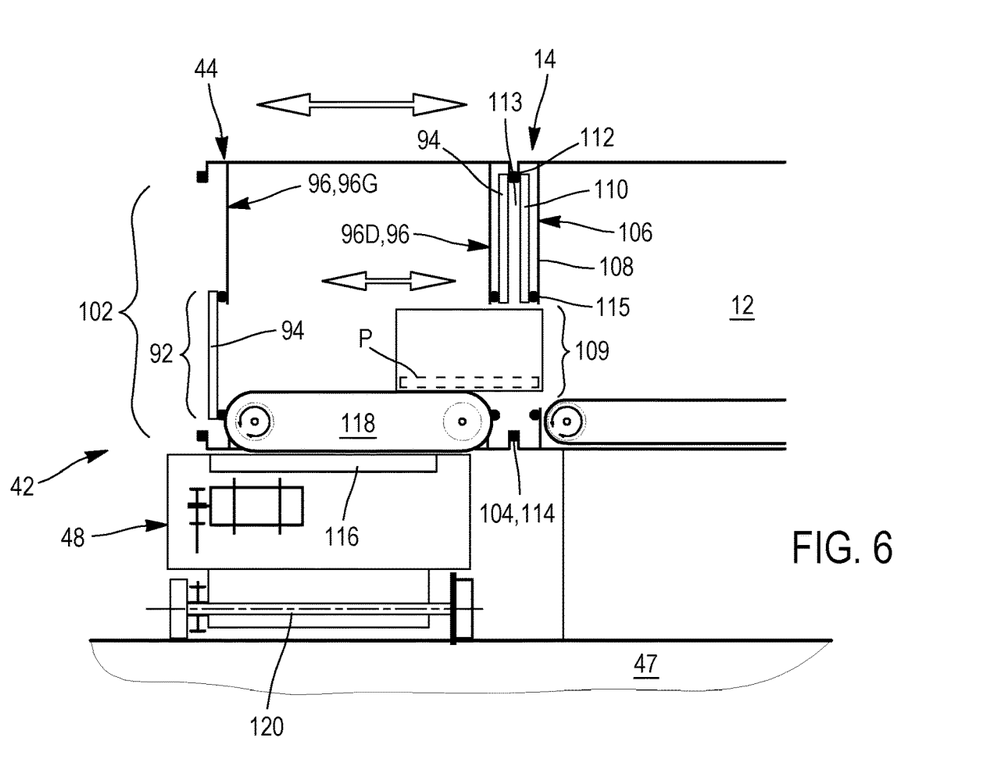
FIG. 6 is a schematic sectional view showing the extraction or insertion of an additive manufacturing container/tray assembly from/into the manufacturing chamber of an additive manufacturing machine with a conveying device according to the invention.

As can be seen in FIG. 6, each machine M1, M2, M3, M4 comprises a manufacturing chamber 12 and is used to manufacture parts in an automated and contained manner inside said chamber 12. The manufacture is said to be contained because the manufacturing chamber 12 may be closed in a sealed manner, in such a way as to prevent the circulation of air from inside said manufacturing chamber 12 to the outside of said chamber, i.e. to the containment chamber 10 of the facility.

Advantageously, each machine M1, M2, M3, M4 may comprise several, and preferably two, work zones inside its manufacturing chamber 12. Thus, each machine makes it possible to manufacture parts on several additive manufacturing trays simultaneously.

Figure 4:
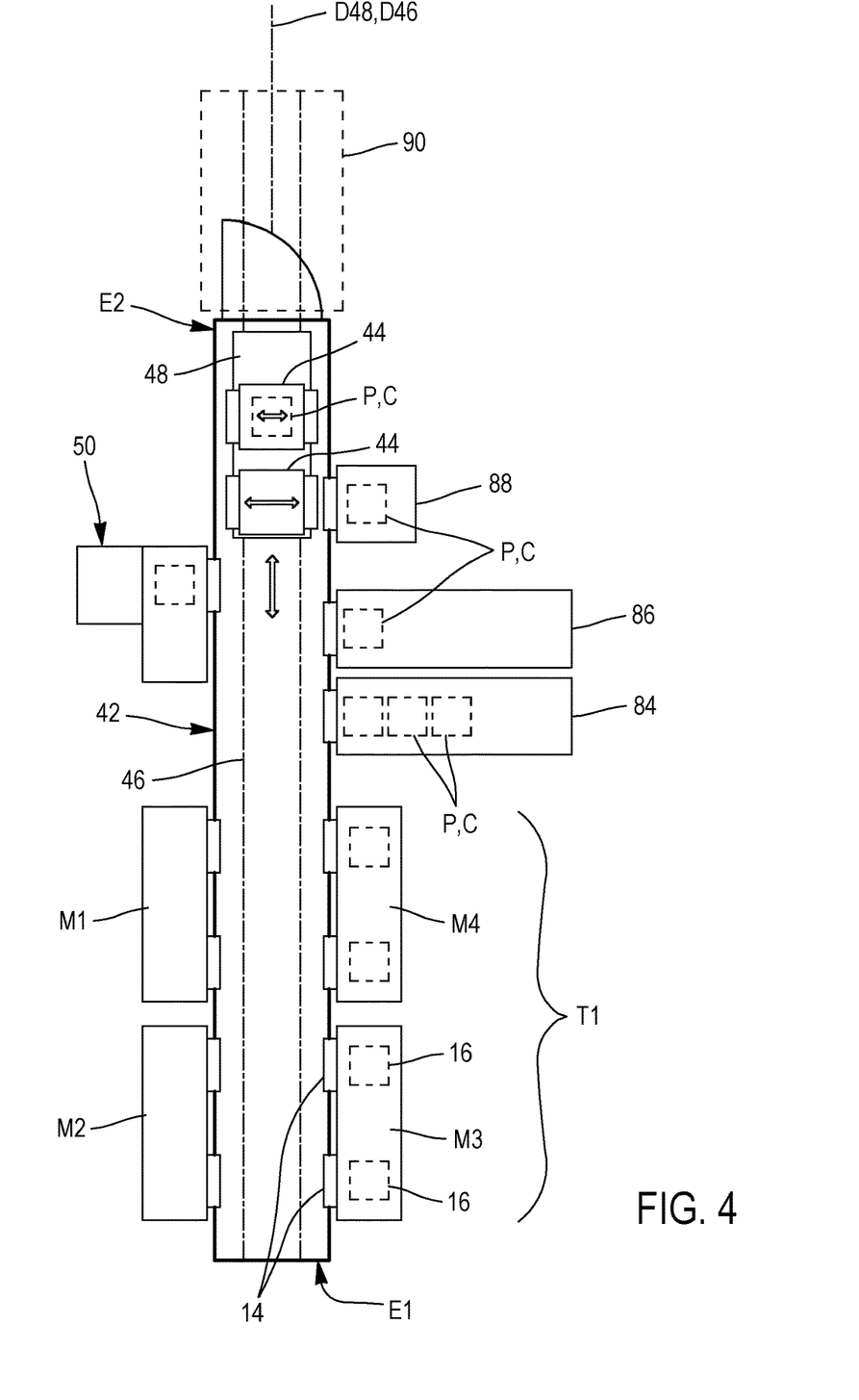
FIG. 4 is a view in detail of FIG. 1.
Figure 5:
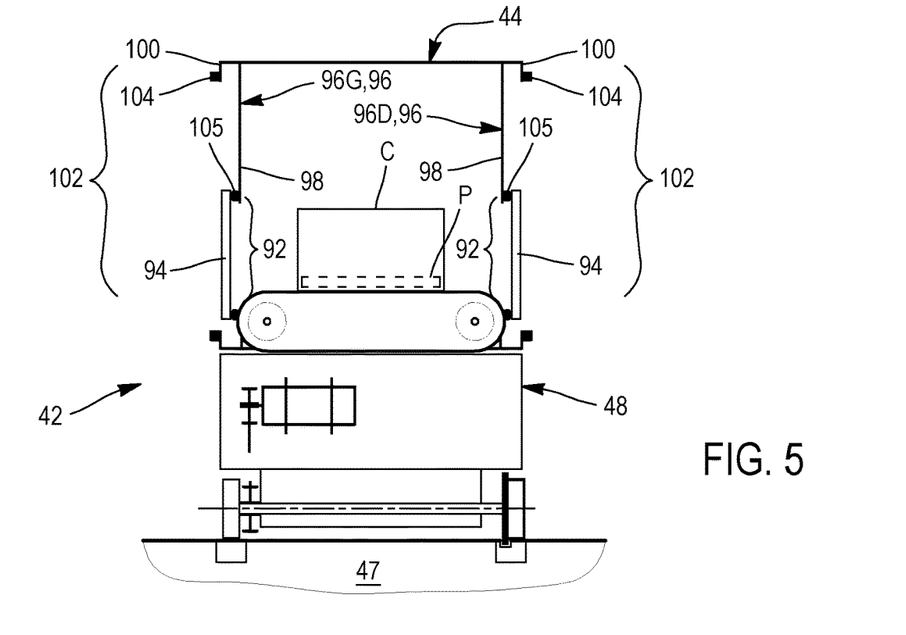
FIG. 5 is a schematic sectional view of a conveying device for conveying additive manufacturing container/tray assemblies according to the invention.

As shown in FIG. 4, the chamber 12 of each machine M1, M2, M3, M4 may comprise as many entry/exit airlocks 14 for additive manufacturing container/tray assemblies as there are work zones 16, the container/tray assemblies entering and exiting each work zone 16 via an entry/exit airlock 14 dedicated to said work zone.

In order to supply, in an automated and contained manner, the various machines M1, M2, M3, M4 of the facility with an additive manufacturing powder that is ready for use in additive manufacturing, the facility includes, inside the containment chamber 10, a powder supply device 18 and supply circuit 20. Said supply circuit 20 connects the supply device 18 to the various machines M1, M2, M3, M4 of the facility. Advantageously, the supply device 18 is also used to prepare the powder before dispensing it to the machines, said preparation comprising, for example, steps of drying and sieving the powder.

Since the supply device 18 comprises numerous conduits connecting processing, metering and powder flow control devices, said supply device 18 comprises numerous junctions through which grains of powder can escape. Since some additive manufacturing powders may include toxic compounds, the invention provides for isolation of the supply device 18 from the rest of the facility. To this end, the supply device 18 is contained within a protective chamber 22 provided inside the containment chamber 10 of the facility, the conduit or conduits 24 of the supply circuit 20 passing through a wall 26 of said protective chamber 22 in a sealed manner. In order to allow the conduit 24 to pass through the wall 26 in a sealed manner, an opening is for example made in said wall 26 and sealing means are provided at said opening between said wall 26 and said conduit 24.

Again with a view to limiting powder leakage in the containment chamber 10 of the facility, the supply circuit 20 conveys the powder, by suction from the supply device 18, to the machines M1, M2, M3, M4 of the facility.

In order to avoid operators having to enter the containment chamber 10 or the protective chamber 22 of the supply device 18 to replenish it with powder, provision is made to replenish said supply device 18 from outside the protective chamber 22 and from outside the containment chamber 10 of the facility. To this end, a replenishment room 28 is provided outside the containment chamber 10, a replenishment circuit 30 serving to connect a replenishment container 32 located in said replenishment room 28 to the supply device 18. Like the conduit or conduits 24 of the supply circuit 20, the conduit or conduits 36 of said replenishment circuit 30 pass through the wall or walls 34 of the containment chamber 10 and the protective chamber 22 in a sealed manner.

Advantageously, a powder recovery circuit 38 connects each machine M1, M2, M3, M4 of the facility to the supply device 18 so as to recycle and reuse the excess additive manufacturing powder deposited in each machine of the facility. Said recovery circuit 38 conveys the powder, by suction from the machines M1, M2, M3, M4, to the supply device 18, and the conduit or conduits 40 of the recovery circuit 38 pass through the wall 26 of the protective chamber 22 in a sealed manner.

Again in the containment chamber 10, and for complete automation of the facility, said facility also includes a conveying device 42 for conveying additive manufacturing container/tray assemblies C.

Additive manufacturing container/tray assembly C means the assembly made up of an additive manufacturing tray and an additive manufacturing container. The container takes the form of a wall surrounding the tray and it serves to transport the tray with the manufactured parts and the unconsolidated powder surrounding them.

In order to convey these additive manufacturing container/tray assemblies C, the conveying device 42 comprises at least one conveying chamber 44 circulating between the various machines M1, M2, M3, M4. Said conveying device 42 makes it possible to supply, in an automated and contained manner, the various machines M1, M2, M3, M4 of the facility with clean trays P and to retrieve, in an automated and contained manner, the trays P that have been used by these machines M1, M2, M3, M4, as well as the manufactured parts.

As a variant or where specifically required, the conveying device 42 also makes it possible to transport, in a contained manner, trays P alone, that is to say without containers, but with or without the manufactured parts. In the case where the conveying device 42 is used to transport trays without containers but with the manufactured parts, the machines M1, M2, M3, M4 are preferably equipped with means for recovering the unconsolidated powder surrounding the manufactured parts at the end of an additive manufacturing cycle.

In more detail, the conveying device 42 takes the form of a circulation path 46 extending within the containment chamber 10 of the facility and on the floor 47 of said chamber 10, the conveying chamber or chambers 44 being mounted on a trolley 48 designed to run on said path 46, as shown in FIGS. 2 to 6.

Preferably, the circulation path 46 is rectilinear and the various machines M1, M2, M3, M4 of the facility are distributed on either side of a first section T1 of said circulation path 46. Again preferably, said first section T1 is located at a first end E1 of the circulation path 46 of the conveying device 42.

Again in the containment chamber 10, and for complete automation of the facility, the facility includes a cleaning device 50 comprising at least one cleaning chamber 52 for cleaning, in an automated and contained manner, the additive manufacturing trays P, and also the manufactured parts, in said cleaning chamber 52.

In a preferred variant, the cleaning device 50 comprises a first dry cleaning chamber 52 and a second wet cleaning chamber 54, and a conveyor 56 for transporting the trays P from one chamber to another. Advantageously, the wet cleaning chamber 54 is located near an entry/exit airlock 58 for inserting the additive manufacturing trays P into the containment chamber 10 and extracting the trays P from the containment chamber 10, a second conveyor 60 for conveying trays P being provided between said wet cleaning chamber 54 and said airlock 58. Advantageously, only the trays P and the manufactured parts require cleaning because they are to be extracted from the containment chamber 10, unlike the containers, which remain inside the containment chamber 10.

In a preferred embodiment of the facility, the cleaning device 50 and the entry/exit airlock 58 for the trays P are located at the second end E2 of the rectilinear circulation path 46 of the conveying device 42.

In order to optimize the containment of the container/tray assemblies C in the various chambers of the various machines and devices of the facility, the facility includes a device 62 for controlling the air pressure inside the containment chamber 10 of the facility, devices 64 for controlling the air pressure inside the manufacturing chambers 12 of the additive manufacturing machines M1, M2, M3, M4, a device 66 for controlling the air pressure inside each conveying chamber 44 of the conveying device 42, and a device 68 for controlling the air pressure inside at least one cleaning chamber 52, 54 of the cleaning device 50. With these various devices 62, 64, 66 and 68, it is possible to keep the air in the chambers 12, 44, 52 and 54 at pressures below or equal to the air pressure in the containment chamber 10. Any leakage of toxic powder grains from these chambers 12, 44, 52 and 54 to the containment chamber 10 is thus limited.

Advantageously, the device 62 also makes it possible to treat the air before introducing it inside the containment chamber 10 of the facility. For example, the device 62 makes it possible to filter and control the temperature and humidity of the air taken from outside the containment chamber 10 before introducing it into said chamber.

In order to be able to manage the inerting of the manufacturing chambers 12 and conveying chambers 44, the devices 64 may also be used to control the gaseous composition of the air introduced into the manufacturing chambers 12 of the additive manufacturing machines M1, M2, M3, M4, and the device 66 may also be used to control the gaseous composition of the air introduced into each conveying chamber 44 of the conveying device 42. More specifically, the devices 64 and 66 may be used to control the level of oxygen in the air introduced into the chambers to which these devices are connected. Providing for inerting of each conveying chamber 44 dispenses with the need for the machines M1, M2, M3, M4 to be equipped with an inerting airlock and avoids re-inerting the air present in each manufacturing chamber after each entry/exit of a container/tray assembly C. Advantageously, the devices 64 and 66 may also be used to manage, from outside of the containment chamber 10, the de-inerting of the chambers to which they are connected.

Preferably, all of these various devices 62, 64, 66 and 68 are located outside the containment chamber 10 of the facility. Therefore, these devices do not clutter the working volume of the containment chamber 10 and it is possible to intervene on these devices without having to enter the containment chamber 10 with the required protective equipment. In addition, because they are located outside the containment chamber 10 of the facility, these various devices 62, 64, 66 and 68 do not require regular decontamination.

In order to promote the evacuation of grains or particles of high density additive manufacturing powder, a downward air flow is provided in the containment chamber 10 of the facility. To this end, the ceiling 70 of the containment chamber 10 is equipped with at least one ventilator 72 through which air is introduced into the containment chamber, and at least one air extractor 74 through which air is extracted from the containment chamber 10 is provided level with the floor 47 of the containment chamber. In more detail, the ventilator 72, for example taking the form of a ventilation rail, is connected to the device 62 for controlling the pressure and the composition of the air inside the containment chamber 10 of the facility, and each air extractor 74 is connected to a filtration device 76 for filtering the air before discharging it out of the containment chamber 10.

In order to control their operation from outside the containment chamber 10 of the facility, each additive manufacturing machine M1, M2, M3, M4, along with the cleaning device 50 and the conveying device 42, comprise a management interface 78 located outside the containment chamber 10 of the facility. Preferably, a single management interface 78 is shared by the various machines and the various devices mentioned above. As shown in FIG. 1, said shared management interface 78 may be installed in a supervision booth 80 located outside the containment chamber 10.

In order to limit the surfaces on which grains of unconsolidated powder may be deposited above the floor 47 of the containment chamber 10, and as the management interface 78 and the means for supplying air, such as the devices 64, 66 and 68, and/or electrical power and/or pneumatic power to the additive manufacturing machines M1, M2, M3, M4, the cleaning device 50 and the conveying device 42, are located outside the containment chamber 10 of the facility, the computer links, for example wiring, connecting the additive manufacturing machines M1, M2, M3, M4, the cleaning device 50 and the conveying device 42 to their management interface 78, and their connections, for example conduits and cables 81, to their means for supplying air and/or electrical power and/or pneumatic power, extend between the top of these machines and these devices and the ceiling 70 of the containment chamber. As the conveying device 42 is mobile, it is connected to its management interface 78 and to its supply means via a drag chain 82.

In order to regulate the flows of container/tray assemblies C between the machines M1, M2, M3, M4 and the cleaning device 50, two devices 84 and 86 for storing container/tray assemblies C are provided. The chambers of said storage devices are designed to be placed in communication with the conveying chamber or chambers 44 of the conveying device 42. In order to avoid contamination of the clean trays P, one of these devices 84 is dedicated to the storage of container/tray assemblies C containing clean trays P, and the other device 86 is dedicated to the storage of container/tray assemblies C containing trays P to be cleaned. Advantageously, it may also be envisaged inerting the storage chambers of these devices 84, 86 and controlling the air pressure inside these chambers. Preferably, these two storage devices 84 and 86 are located towards the centre of the circulation path 46 of the conveying device 42, between the machines M1, M2, M3, M4 and the cleaning device 50.

In order to allow manual extraction of a damaged or defective tray P or container/tray assembly C, a maintenance airlock 88 is provided along the circulation path 46 of the conveying device 42. The chamber of said maintenance airlock 88 is designed to be placed in communication with the conveying chamber or chambers 44 of the conveying device 42. Preferably, said maintenance airlock 88 is located at the second end E2 of the circulation path 46 of the conveying device 42.

Again at the second end E2 of the circulation path 46 of the conveying device 42, and at the end of said path 46, a maintenance zone 90 is provided for carrying out various maintenance procedures on the trolley 48 of the conveying device 42, such as the replacement of a conveying chamber 44, for example.

In addition to the various containment chambers and the various air flow and treatment devices that have just been described, the invention also provides a method for improving the containment of the container/tray assemblies C, and hence of the trays P, transported and used in the various chambers of the various devices and machines of the facility.

Firstly, and in order to protect the environment outside the facility, such as the other facilities of a plant, according to the containment method, the air inside the containment chamber 10 is kept at a pressure below the air outside the containment chamber. Any leakage of additive manufacturing powder grains to the outside of the facility is thus prevented.

Then, as each conveying chamber 44 is designed to be placed in communication with the manufacturing chambers 12 of the various machines M1, M2, M3, M4, according to the containment method, the air pressure inside each conveying chamber 44 is substantially equal to the air pressure inside the manufacturing chamber 12 of each additive manufacturing machine M1, M2, M3, M4.

In order to avoid re-inerting of the manufacturing chamber 12 of an additive manufacturing machine M1, M2, M3, M4 after each extraction and insertion of an additive manufacturing container/tray assembly C, also according to the containment method, the composition of the air inside each conveying chamber 44 is kept substantially identical to the composition of the air inside the manufacturing chamber 12 of each additive manufacturing machine M1, M2, M3, M4, particularly with regard to the proportion of oxygen and inert gas, such as nitrogen, in said air.

In order to optimize the containment of the dry cleaning chamber 52 of the cleaning device 50, according to the containment method, the air pressure inside the dry cleaning chamber 52 is kept below the air pressure maintained inside the containment chamber 10 of the facility.

Lastly, and in order to optimize the containment of the supply device 18 in its protective chamber 22 provided inside the containment chamber 10 of the facility, according to the containment method, the air pressure inside the protective chamber 22 is kept below the air pressure maintained inside the containment chamber 10.

In parallel with the complete automation of the additive manufacturing facility and the containment of the container/tray assemblies C in various chambers, the invention also relates to a conveying device 42 for conveying said additive manufacturing container/tray assemblies C.

As shown in FIGS. 3 to 6, the conveying device 42 comprises at least two conveying chambers 44 for conveying an additive manufacturing container/tray assembly C. Each conveying chamber 44 comprises at least one opening 92 for the entry/exit of an additive manufacturing container/tray assembly C, and each opening 92 is provided with a door 94 for closing the conveying chamber 44 in a sealed manner.

As they are associated with the trolley 48 and with the circulation path 46 of the conveying device 42, the two conveying chambers 44 may be used to transport additive manufacturing container/tray assemblies C, and hence additive manufacturing trays P, in a contained and automated manner between the various machines M1, M2, M3, M4 and the various devices 50, 84, 86, 88 of the facility. Moreover, by transporting the clean trays P separately from those to be cleaned, the two conveying chambers 44 make it possible to preserve the cleanliness of the clean trays P until they are put in place and used within the manufacturing chamber 12 of an additive manufacturing machine.

To ensure optimum sealing between a conveying chamber 44 and the manufacturing chamber 12 of a machine M1, M2, M3, M4 during the transfer of a container/tray assembly C between these two chambers, each wall 96 of a conveying chamber provided with an opening 92 for the entry/exit of an additive manufacturing container/tray assembly C takes the form of a double wall comprising an inner wall 98 and an outer wall 100, each traversed by an opening 92, 102 for the entry/exit of an additive manufacturing container/tray assembly C, the opening 92 in the inner wall 98 being equipped with a door 94 for closing said inner wall 98, and hence the conveying chamber 44, in a sealed manner, while the opening 102 in the outer wall 100 is equipped with a peripheral seal 104. Preferably, a peripheral seal 105 is also provided between the door 94 and the inner wall 98. In order to achieve sealing between a conveying chamber 44 and the manufacturing chamber 12 of an additive manufacturing machine M1, M2, M3, M4, the opening 102 preferably extends over the entire surface of the outer wall 100.

Ideally, and as shown in FIG. 6, the wall 106 of a manufacturing chamber 12 designed to be placed in contact with the wall 96 of a conveying chamber 44 also takes the form of a double wall with an inner wall 108 and an outer wall 112. The inner wall 108 comprises an opening 109 closed by a door 110, a peripheral seal 115 being provided between the door 110 and the inner wall 108, and an outer wall 112 with an opening 113 equipped with a peripheral seal 114.

Advantageously, each conveying chamber 44 of the conveying device 42 is equipped with an actuator 116, such as a rack system, for moving said conveying chamber 44 laterally relative to the trolley 48. Thus, during the transfer of a container/tray assembly C between a conveying chamber 44 and a manufacturing chamber 12, the wall 96 of the conveying chamber 44 is pressed against the wall 106 of the manufacturing chamber 12, and the seals 104, 114 of the outer walls 100, 112 are compressed against one another so as to seal the communication between these two chambers.

To save space and to facilitate bringing the conveying chambers 44 alongside the manufacturing chambers 12, the doors 94 of the conveying chambers 44 and the doors 110 of the manufacturing chambers 12 are sliding.

In one embodiment of the conveying device 42 optimized vis-à-vis the rectilinear circulation path 46 and the linear arrangement of the facility, each conveying chamber 44 comprises at least two opposite side walls 96D, 96G, and each of these opposite side walls 96D, 96G comprises an opening 92 for the entry/exit of an additive manufacturing container/tray assembly C, provided with a door 94 for closing the conveying chamber 44 in a sealed manner. Thus, the conveying chambers 44 make it possible to bring container/tray assemblies C to machines M1, M2, M3, M4 and to various devices 50, 84, 86, 88 arranged on either side of the circulation path 46.

Again according to an embodiment of the conveying device 42 optimized vis-à-vis the rectilinear circulation path 46 and the linear arrangement of the facility, as the conveying device 42 comprises a trolley 48 on which the conveying chambers 44 are mounted, the conveying chambers 44 are juxtaposed on the trolley 48 in such a way that each opening 92 in a conveying chamber 44 is juxtaposed with the opening 92 in another conveying chamber.

As the trolley 48 extends in a longitudinal direction D48 parallel to the direction D46 of the circulation path 46 on which it travels, the conveying chambers 44 are open in a transverse direction DT perpendicular to the longitudinal direction D48 of the trolley 48, and preferably on either side of said longitudinal direction D48. Moreover, when an actuator 116 moves a conveying chamber 44 laterally relative to the trolley 48, it moves it in said transverse direction DT.

In addition to the actuator 116 for moving a conveying chamber 44 transversely, each conveying chamber 44 comprises an internal conveyor 118 for moving an additive manufacturing container/tray assembly C or tray P in translation through each opening 92 in said chamber. More precisely, said internal conveyor 118 makes it possible to move a container/tray assembly C or tray P in the transverse direction DT perpendicular to the longitudinal direction D48 of the trolley 48.

For autonomous movements of the trolley 48 along the circulation path 46, at least one axle 120 of said trolley 48 is motorized.

Advantageously, the conveying device 42 and its conveying chambers 44 may be used to transport trays P alone or with the manufactured parts.

From a more general point of view, the invention also relates to a method for conveying an additive manufacturing container/tray assembly C or trays P within an additive manufacturing facility comprising a plurality of additive manufacturing machines M1, M2, M3, M4.

In accordance with the invention, according to said conveying method, the additive manufacturing container/tray assemblies C or trays P are transported in an automated and contained manner within said facility, i.e. within the containment chamber 10 of said facility, between the various machines M1, M2, M3, M4 and the various devices 50, 84, 86, 88 present within said chamber.

Advantageously, also according to said conveying method, the additive manufacturing container/tray assemblies C or trays P are transported in an automated and contained manner in a controlled atmosphere within said facility, in particular by controlling the proportion of oxygen and inert gas, such as nitrogen, in the air present inside the conveying chambers 44, for example by means of the device 66 and the connections 81, 82.

Lastly, and in particular by virtue of the presence of two conveying chambers 44, according to the method, the clean trays P are conveyed in a conveying chamber other than the conveying chamber used to convey the trays P that have been used by the additive manufacturing machines M1, M2, M3, M4. Preferably, one conveying chamber 44 is used for transporting the clean trays P, and the other chamber 44 of the conveying device 42 is used for transporting the trays P that have been used in additive manufacturing.

By completely automating the transport of the additive manufacturing container/tray assemblies C or trays P within the facility and by virtue of the presence of the storage devices 84 and 86, the time for which the additive manufacturing machines M1, M2, M3, M4 are effectively in use is maximized. Likewise, because the cleaning of the trays P and the supplying with powder are done externally and mutually, the time for which the additive manufacturing machines M1, M2, M3, M4 are effectively in use is maximized, in particular in comparison with prior art machines incorporating internal means for cleaning the trays and recycling powder.

The invention claimed is:

1. A device for conveying additive manufacturing container/tray assemblies or additive manufacturing trays, the device comprising:
    a plurality of chambers for conveying an additive manufacturing container/tray assembly or an additive manufacturing tray, each conveying chamber comprising an opening allowing the entry and exit of an additive manufacturing container/tray assembly or an additive manufacturing tray,
    wherein the opening is provided with a door for closing the conveying chamber in a sealed manner.

2. A device according to claim 1, wherein each conveying chamber comprises a wall, wherein the wall is a double wall comprising (1) an inner wall, which is traversed by the opening, and (2) an outer wall, which is traversed by another opening for the entry/exit of an additive manufacturing container/tray assembly or an additive manufacturing tray, wherein the opening of the inner wall is equipped with the door, which closes the inner wall in a sealed manner, and wherein the opening of the outer wall is equipped with a peripheral seal.

3. A device according to claim 1, wherein each conveying chamber comprises a plurality of opposite side walls, and wherein each of the plurality of opposite side walls comprises an opening for the entry/exit of an additive manufacturing container/tray assembly or an additive manufacturing tray, the opening being provided with a door for closing the conveying chamber in a sealed manner.

4. A device according to claim 1, further comprising a trolley on which the plurality of conveying chambers are mounted, wherein the conveying chambers are arranged side by side on the trolley in such a way that each opening in a conveying chamber is arranged side by side with the opening in another conveying chamber.

5. A device according to claim 4, wherein the trolley extends in a longitudinal direction parallel to a direction of the a circulation path on which it travels, and wherein the plurality of conveying chambers are open in a transverse direction perpendicular to the longitudinal direction of the trolley.

6. A device according to claim 1, wherein each conveying chamber comprises an internal conveyor for moving, by translation, an additive manufacturing container/tray assembly or additive manufacturing tray through the opening in the conveying chamber.

7. An additive manufacturing facility comprising:
a plurality of additive manufacturing machines; and
a device for conveying additive manufacturing container/tray assemblies or additive manufacturing trays according to claim 1, the device being provided between the plurality of additive manufacturing machines.

8. A method for conveying additive manufacturing container/tray assemblies or additive manufacturing trays within an additive manufacturing facility comprising a plurality of additive manufacturing machines, wherein the additive manufacturing container/tray assemblies or additive manufacturing trays are transported in an automated and contained manner within the facility, and wherein clean assemblies or trays are conveyed in a conveying chamber other than a conveying chamber used to convey assemblies or trays that have been used by an additive manufacturing machine.

9. A method according to claim 8, wherein the additive manufacturing container/tray assemblies or additive manufacturing trays are transported in an automated and contained manner in a controlled atmosphere within the facility.

* * * * *